July 6, 1926. 1,591,246
M. E. STOHLGREN
ANIMAL TRAP
Filed July 27, 1925
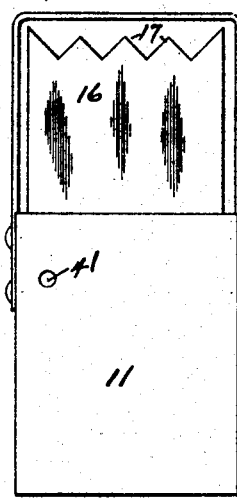
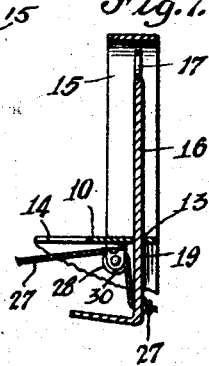
Inventor
Martin E. Stohlgren
By Silas L. Sweet
Attorney Patented July 6, 1926.

1,591,246

UNITED STATES PATENT OFFICE.

MARTIN E. STOHLGREN, OF DES MOINES, IOWA.

ANIMAL TRAP.

Application filed July 27, 1925. Serial No. 46,307.

An object of this invention is to provide an improved construction for an animal trap.

A further object of this invention is to provide an improved trigger assembly for an animal trap.

A further object of this invention is to provide a locking device for safety of an animal trap in set position preliminary to completing the setting arrangement thereof.

A further object of this invention is to provide improved means for operating the movable jaw when a trap is sprung.

By invention consists in the construction, arrangement and combination of elements hereinafter set forth, pointed out in the claims and illustrated by the accompanying drawing, in which—

Figure 1 is a front elevation of the complete trap in sprung position. Figure 2 is a front elevation of the same, the front door being removed. Figure 3 is a vertical section on the indicated line 3—3 of Figure 2, the trap elements being shown in set position and a locking device being shown in position to prevent accidental springing of said elements. Figure 4 is a horizontal section on the indicated line 4—4 of Figure 2, the trap elements being shown in set position. Figures 5 and 6 are detail views. Figure 7 is a detail sectional view on the indicated line of Figure 2.

In the construction of the trap as shown the numeral 10 designates a prismatic frame formed with openings at its front and rear adapted to be closed by slip-on doors 11, 12 telescoping with the front and rear margins thereof and also formed with a transverse slot 13 in its top adjacent and parallel with its rear margin and also formed with a substantially-square opening 14 in its top in front of said slot. A stationary jaw 15, of square-arch form is mounted on the frame 10 and is fixed by the extremities of its arms to the sides thereof and the top of said jaw extends across the frame above and parallel with the slot 13. The frame 10, doors 11, 12 and jaw 15 preferably are made of sheet metal, bent, stamped and formed as desired to produce a box or inclosure surmounted by said jaw. A movable jaw 16 is formed relatively flat, with teeth 17 on its upper margin, side or outermost teeth preferably being of greater height than the mean teeth, and with a flange 18 on its lower margin, which is bent backwards and upwards at a slight angle as shown in Figures 3 and 7. The movable jaw 16 is formed with trunnions 16' slidingly engaged in vertical slide bearings 19, 20 formed on or fixed to the sides of the frame opening inwardly therefrom, the lower ends of said bearing being curved outwardly, and the toothed upper margin of said jaw extends slightly through the slot 13 when in set position and is adapted to move into proximity to or contact with the lower face of the cross member of the fixed jaw when the trap is sprung. A yoke 21 is mounted in upright position in the frame 10, substantially at one side of the center thereof, and is fixed to the bottom of the frame and stiffened by struts 22, 23, connecting the arms thereof. An arbor 24 is fixed in and extends across the yoke 21, one end of said arbor being made angular and received in an angular notch 25' in a clip 25 fixed to one arm of said yoke. A grooved drum 26 is mounted loosely on the arbor 24 within the yoke 21 and a draft device, such as a cord or chain 27, is fixed to and adapted to be wound in said drum. The draft device is rove through a pulley 28 carried in brackets 29, 30 depending from the top of the frame 10 between the slot 13 and opening 14 and the outer end thereof is fixed to the movable jaw 16 adjacent the flange 18. A convolute spring 31 is fixed at one end to and is adapted to be wound on the arbor 24 within the yoke 21 and the outer end of said spring is secured by a pin 32 to the drum 26 adjacent the periphery of said drum. A pair of angle irons 33, 34 are placed in parallel positions on the inner face of one side of the frame 10 and a bar 35 is pivoted between them and occupies a substantially upright position. A pan 36 is fixed at one end to the upper end of the bar 35 and extends across the opening 14 beneath the top of the frame 10. A trigger 37 is pivoted at its lower end on a yoke 38 fixed to and rising from the bottom of the frame 10 and said trigger extends upwardly alongside the arm 35 and is formed with a lug, struck out therefrom, 39, adapted to engage the inner margin of said arm to hold the trigger in set position. The base of the trigger 37 is curved forwardly over the rear margin of and is adapted to overlay and engage the flange 18 and hold the movable jaw 16 in set position against the pull of the draft device and resilience of the spring 31. The trigger also is formed with a lip 37' adapted to be engaged by the bottom of the flange 18, in a downward movement of the jaw 16, to oscillate the trigger into set position. The upper end portion of the trigger 37 and adjacent margin of the bar 35 are inclined, so that the trigger may engage and press against said bar and insure engagement of the bar with the lug 39. The angle irons 33, 34 and bar 35 are formed with holes 40 adapted to register when the trap is in set position. A similar hole 41 is formed in the front cover 11 and a rod 42 may be mounted through said holes and lock the bar 35 and pan 36 against movement, thus holding the trigger 37 in set position and, by engagement of its curved base portion with the rear margin of the flange 18, preventing accidental springing of the trap while said trap is being placed in desired position for use (Fig. 3). A hole 43 is formed in the lower portion of the jaw 16 adjacent the attachment thereto of the draft device 27, and a tool 44, of hook form, is adapted to be inserted in said hole (when the rear door or cover 12 is removed) and be employed to move said jaw to set position by manual force applied thereto.

After the trap is set and locked in set position, the tool 44 is removed and the rear door or cover is placed in position on the frame. Then the trap is positioned as desired relative to a runway of an animal to be caught and killed therein. An earth tunnel is formed over the fixed jaw and on either side thereof, registering with the opening therein, the frame being buried to the desired extent. The scent or bait, if any is used, is properly placed and then the rod 42 is withdrawn manually from the holes 40 and 41. An animal passing through the fixed jaw and tunnel provided therewith, springs the trap by stepping on or engaging and depressing the pan 36 (previously covered with dirt, sand or leaves for concealment) and thereby removes the bar 35 from the lug 39 and permits the triggers 37 to oscillate forwardly and release the flange 18, upon which the movable jaw 16 is forced upward rapidly by the pull of the spring 31 and catches the animal between the toothed margin thereof and the cross member of the fixed jaw 15, with killing effect.

I claim as my invention—

1. An animal trap comprising a frame, formed with an opening in its top and a slot in its top adjacent said opening and also formed with slide bearings communicating with said slot, a fixed jaw arched over said slot, a movable jaw formed with trunnions mounted slidingly in said bearings and spring-actuated toward the fixed jaw, a pan extending across and beneath said opening, a bar pivoted to the frame and carrying said pan, a trigger pivoted in the frame, engaging means on said trigger adapted to be engaged by said bar at times, and a lip on the trigger adapted to be engaged by the movable jaw in set position.

2. An animal trap comprising a frame, a fixed jaw mounted on said frame, said frame being formed with slide bearings registering with the fixed jaw, said bearings being formed with curved lower end portions, a movable jaw formed with trunnions mounted slidingly in said bearings and adapted to engage at times with the curved portions thereof at its lower end, said movable jaw being formed with a curved flange, spring devices for moving said movable jaw toward the fixed jaw, a trigger pivoted in the frame and formed with a lip adapted to be engaged by said flange to set said trigger, said trigger being adapted to engage said flange and hold said movable jaw in set position, and a pan device pivoted in said frame and adapted to engage and hold the trigger in set position.

3. An animal trap having a housing, a fixed jaw thereon and a movable jaw adapted to operate in and out of the housing relative to the fixed jaw, said housing being adapted to be buried relative to a runway of an animal, operating devices in said housing adapted to set and spring said movable jaw and mounted on supports therein, openings in said operating devices and in said supports which register when said trap is in set position and are adapted to receive a locking pin.

4. In an animal trap, a frame formed with slide bearings curved laterally at their lower ends, a sliding jaw mounted therein, a flange on said jaw, a trigger pivoted in the frame and adapted to engage and hold the jaw in set position, a pan device engaging said trigger and adapted to hold it in set position, whereby the strain of the jaw-operating devices is directed to the curved portions of the bearings to produce a sensitive trigger-action.

5. In an animal trap, a frame, a fixed jaw thereon, a movable jaw mounted for reciprocation in the frame and within the fixed jaw, a support mounted in the frame, an arbor fixed in said support, a drum pivoted on said arbor, a draft device fixed at one end to said movable jaw fixed at the other end to and adapted to be wound on said drum, a convolute spring fixed at one end to said arbor and at the other end to said drum, a trigger adapted to engage and hold said movable jaw in set position and a pan device adapted to engage and hold said trigger in set position.

6. In an animal trap a housing formed with removable doors and also formed with a pan-opening in its top and a slot in its top adjacent said pan-opening, a fixed jaw carried by said housing and extending across and above said slot, said housing being adapted to be buried relative to a runway of an animal, a movable jaw slidingly mounted in said housing and adapted to extend through said slot and operating devices mounted in said housing and adapted to set and spring said movable jaw.

7. An animal trap having a housing formed with a pan-opening in its top and formed with a slot adjacent said opening, and formed with slide bearings communicating with said slot, a jaw mounted on said housing and extending across and above said slot, a movable jaw formed with trunnions mounted for reciprocation in said bearings and adapted to extend through said slot, spring-operated devices within the housing adapted to move said latter jaw outwardly, a pan device within the housing extending across and beneath said pan-opening, a trigger within the housing adapted to be engaged and set by said movable jaw and also adapted to engage and hold said movable jaw in set position, and means for engaging the trigger with the pan device.

Signed at Des Moines, in the county of Polk and State of Iowa, this 10th day of July, 1925.

MARTIN E. STOHLGREN.